United States Patent
Yabusaki (12) 
(10) Patent No.: US 7,036,262 B2
(45) Date of Patent: May 2, 2006

(54) FISHERPERSON'S TOOL FOR USING SLOTTED WEIGHTS WITH A FISHING LINE

(76) Inventor: Kenichi K. Yabusaki, 555 Pierce St., Suite 3, Albany, CA (US) 94706

( * ) Notice: Subject to any disclaimer, the term of this patent is extended or adjusted under 35 U.S.C. 154(b) by 0 days.

(21) Appl. No.: 10/751,182

(22) Filed: Dec. 31, 2003

(65) Prior Publication Data

US 2005/0150150 A1    Jul. 14, 2005

(51) Int. Cl.
*A01K 97/00* (2006.01)

(52) U.S. Cl. .............................. 43/4; 43/4.5; 43/44.89; 7/121; 294/25; 30/298

(58) Field of Classification Search ...................... 43/1, 43/4, 4.5, 44.89; 2/21; 7/121; 16/108; 223/101; 294/25; 30/298; D3/29; D4/103
See application file for complete search history.

(56) References Cited

U.S. PATENT DOCUMENTS

| | | | |
|---|---|---|---|
| 87,856 A * | 3/1869 | Kintz | 30/298 |
| 135,305 A * | 1/1873 | Ackley et al. | 30/298 |
| 136,640 A * | 3/1873 | Bond | 294/25 |
| 203,978 A * | 5/1878 | Woods | 2/21 |
| 310,108 A * | 12/1884 | Winzenried | 294/25 |
| 319,070 A * | 6/1885 | Clark | 294/25 |
| 334,486 A * | 1/1886 | Strong et al. | 30/298 |
| 362,593 A * | 5/1887 | Wells | 223/101 |
| 372,765 A * | 11/1887 | Price | 294/25 |
| 421,665 A * | 2/1890 | Buchman | 30/298 |
| 464,545 A * | 12/1891 | Wood | 223/101 |
| 467,364 A * | 1/1892 | Breen | 294/25 |
| 471,221 A * | 3/1892 | Moores | 294/25 |
| 622,386 A * | 4/1899 | Peery | 2/21 |
| 666,666 A * | 1/1901 | Hackett | 2/21 |
| 671,205 A * | 4/1901 | Bevan | 30/298 |
| 885,569 A * | 4/1908 | Bergquist | 30/298 |
| 931,511 A * | 8/1909 | Southworth | 30/298 |
| 971,186 A * | 9/1910 | Freitag | 30/298 |
| 1,000,226 A * | 8/1911 | Arwine | 30/298 |
| 1,006,367 A * | 10/1911 | Dittmar | 294/25 |
| 1,055,838 A * | 3/1913 | Torrance | 2/21 |
| 1,057,496 A * | 4/1913 | Palter | 223/101 |
| 1,109,457 A * | 9/1914 | Pike | 223/101 |
| 1,155,931 A * | 10/1915 | Keebaugh | 30/298 |
| 1,162,264 A * | 11/1915 | Unsinger | 7/121 |
| 1,184,710 A * | 5/1916 | Baumann | 2/21 |
| 1,220,007 A * | 3/1917 | Rowley | 2/21 |
| 1,255,004 A * | 1/1918 | Gibson | 7/121 |
| 1,311,125 A * | 7/1919 | Johnson | 7/121 |
| 1,349,320 A * | 8/1920 | Carson | 7/121 |
| 1,379,777 A * | 5/1921 | Oijerholm | 223/101 |
| 1,444,976 A * | 2/1923 | Mandley | 30/298 |
| 1,512,943 A * | 10/1924 | Martineau | 7/121 |
| 1,585,936 A * | 5/1926 | Olevin | 7/121 |

(Continued)

FOREIGN PATENT DOCUMENTS

GB    1581750 A1 * 12/1980

(Continued)

*Primary Examiner*—Darren W. Ark
(74) *Attorney, Agent, or Firm*—Howard Lebowitz (57) ABSTRACT

The invention is a tool for use by fisherpersons to remove a split shot weight from a fishing line. The tool includes a finger sheath, a finger retainer and curved blade attached to the finger sheath. In one preferred embodiment the finger sheath and finger retainer are a sewing thimble. The tool may also include a "U" shaped clip for crimping a split shot closed.

22 Claims, 6 Drawing Sheets

U.S. PATENT DOCUMENTS

| | | | |
|---|---|---|---|
| 1,628,188 A * | 5/1927 | Pullen | 7/121 |
| 1,643,336 A * | 9/1927 | Frost | 30/298 |
| 1,763,205 A * | 6/1930 | Winbigler | 294/25 |
| 1,783,984 A * | 12/1930 | Shane | 2/21 |
| 1,822,953 A * | 9/1931 | Bruening | 7/121 |
| 2,155,753 A * | 4/1939 | Cook | 43/4 |
| 2,323,854 A * | 7/1943 | Silverman | 2/21 |
| 2,409,101 A * | 10/1946 | Brittingham | 2/21 |
| 2,458,709 A * | 1/1949 | Kayer | 2/21 |
| 2,460,155 A * | 1/1949 | Talarico | 2/21 |
| 2,487,101 A * | 11/1949 | Colby et al. | 2/21 |
| D158,614 S * | 5/1950 | Quethera | D3/29 |
| 2,603,992 A * | 7/1952 | Brown et al. | 43/4 |
| 2,611,180 A * | 9/1952 | Bella | 7/121 |
| 2,611,953 A * | 9/1952 | Bruening | 7/121 |
| 2,697,277 A * | 12/1954 | Bloxsom | 7/121 |
| 2,704,889 A * | 3/1955 | Delinanos | 223/101 |
| 2,736,026 A * | 2/1956 | Belokin, Jr. | 43/44.89 |
| 2,765,686 A * | 10/1956 | Deline | 43/44.89 |
| 2,765,687 A * | 10/1956 | Stanfield | 43/44.89 |
| 2,790,341 A * | 4/1957 | Keep et al. | 43/44.89 |
| 2,842,993 A * | 7/1958 | Thomas | 43/44.89 |
| 3,070,804 A * | 1/1963 | Parrilla | 2/21 |
| 3,229,403 A * | 1/1966 | Thomas | 43/4 |
| 3,293,958 A * | 12/1966 | Smith | 294/25 |
| D208,047 S * | 7/1967 | Brophy | D3/29 |
| 3,348,541 A * | 10/1967 | Loebeck | 2/21 |
| 3,729,035 A * | 4/1973 | Manzanarez | 294/25 |
| D228,833 S * | 10/1973 | Meyer | D3/29 |
| 4,136,548 A | 1/1979 | Dippold | 72/409.04 |
| 4,149,296 A * | 4/1979 | Stanford | 294/25 |
| 4,177,698 A * | 12/1979 | Greneker | 294/25 |
| 4,239,134 A * | 12/1980 | Joy | 223/101 |
| 4,377,027 A * | 3/1983 | Price | 43/44.89 |
| D271,821 S * | 12/1983 | Kelson | D3/29 |
| 4,466,313 A * | 8/1984 | Gardner | 294/25 |
| 4,474,246 A * | 10/1984 | Arroyo | 294/25 |
| D277,998 S * | 3/1985 | Van Noy | D3/29 |
| 4,797,974 A * | 1/1989 | Smith, Jr. | 294/25 |
| 4,821,378 A * | 4/1989 | Streit et al. | 294/25 |
| 4,867,246 A * | 9/1989 | Kiger | 294/25 |
| 4,899,482 A * | 2/1990 | Gerdes | 43/4 |
| 5,136,744 A * | 8/1992 | Allsop et al. | 43/4 |
| 5,186,189 A * | 2/1993 | Harris | 2/21 |
| 5,207,012 A * | 5/1993 | Lael | 43/4 |
| 5,557,874 A * | 9/1996 | Pietrandrea et al. | 43/4 |
| 5,803,322 A * | 9/1998 | Boone et al. | 223/101 |
| 5,930,888 A | 8/1999 | Ball | 29/817 |
| 5,960,504 A * | 10/1999 | Dougherty | 43/4 |
| 6,012,165 A * | 1/2000 | Cain | 2/21 |
| 6,477,803 B1 | 11/2002 | Casagram | 43/43.12 |

FOREIGN PATENT DOCUMENTS

| | | | |
|---|---|---|---|
| GB | 2183197 A1 * | 6/1987 | |
| JP | 8-80146 B1 * | 3/1996 | |
| JP | 8-289710 B1 * | 11/1996 | |
| JP | 10-37011 B1 * | 2/1998 | |
| JP | 2000-253789 B1 * | 9/2000 | |
| JP | 2001-150358 B1 * | 6/2001 | |
| JP | 2001-346491 B1 * | 12/2001 | |
| JP | 2002-335839 B1 * | 11/2002 | |

* cited by examiner

FISHERPERSON'S TOOL FOR USING SLOTTED WEIGHTS WITH A FISHING LINE

BACKGROUND OF THE INVENTION

1. Field of the Invention

This invention relates to a tool intended for fisherpersons to facilitate the removal and optionally application of slotted weights to a fishing line.

2. Description of the Prior Art

This invention addresses a common problem faced by fly fisherpersons. Slotted weights, such as split shot, are commonly used in fly-fishing to weight the leading end of a fishing line to which an artificial fly is attached so that the fly will sink to the desired depth. Split shot is also used in other forms of fishing such as bait or lure fishing. Split shot is applied by placing the fishing line into the slot and then crimping the slot closed with a tool such as a long nose pliers, forceps, or the like. Split shot is typically made of lead and has either a football like shape with a roughly elliptical cross section or a roughly spherical shape. Split shot is available in a number of popular sizes ranging from a minor axis in the range of about 3 mm to about 6 mm. The shot is removed by reopening the slot by prying it open.

Split shot is often added and removed from a fishing line many times during a fishing session to accommodate changing water conditions and depth at which fish are biting. Manipulating shot is often problematic because a fisherperson is hard pressed to access the proper tools even if tools are available. Removal of split shot from a line while in the act of fishing, such as while wading in a stream or river, is a problem regularly encountered by fly fisherpersons, and while simple in principle, is a challenge during a fishing session.

U.S. Pat. No. 6,477,803 to Casagram discloses a standalone split shot opener including a groove for holding a shot and two sharpened edges that are positioned on flexible arms, such that when the arms are manipulated the sharpened edges move apart. The sharpened edges are forced into the slot in a split shot positioned in the groove. The sharpened edges are pulled apart by manipulating the flexible arms.

U.S. Pat. No. 5,930,888 to Ball and Lyons discloses a device for the storage dispensing and installation of split shot on a fishing line.

U.S. Pat. No. 5,557,874 to Prietcandrea discloses a modified hemostat adapted to be used as a multi-purpose-fishing tool, wherein the handles are adapted to compress and open split shot.

U.S. Pat. No. 4,136,548 to Dippold discloses a tool for attaching slotted weights to a fishing line. The tool has a base having a channel and an opening for insertion of the fishing line traversing the channel. An abutment across the channel is located adjacent to the opening. A transfer block is slidably mounted within the channel in the body. The transfer block urges a slotted weight against the abutment to close the slot and attach the weight to the line. The tool also includes a weight removal device attached so as to be moved with the transfer block, which device opens the slot in the weight and removes the weight from the line.

While these prior art tools are certainly useful implements, there is a need for a very simple tool, preferably without moving parts, that could be readily used to remove split shot from a fishing line in the midst of the fishing experience.

There is a need for a simple shot removal tool without moving parts which is readily usable during the fishing experience which also includes means for compressing a split shot onto a fishing line.

There is a need for a simple shot removal tool as described in any of the preceding two paragraphs that is suitable for and includes means for attaching the device to conventional fishing apparel.

There is a need for a tool as described in any combination of the preceding three paragraphs that is inexpensive to manufacture.

SUMMARY OF THE INVENTION

It is an object of the invention to provide a tool for removal of split shot from a fishing line that satisfies the needs present in the prior art.

It is a further object of the invention to provide a split shot removal tool that is very simple to use and that can be readily deployed during the fishing experience.

It is a still further object of the invention to provide a split shot removal tool that also includes a means for compressing a split shot weight onto a fishing line.

It is a still further object of the invention to provide a split shot removal tool that includes a means for attaching the tool to standard fisherperson clothing and other devices.

The invention derives from the observation that a fisherperson's fingernail is a very convenient item for opening a shot that has been applied to a fishing line. The problem with using a fingernail is that the fingernail is not strong enough for the job and frequently breaks off or is otherwise damaged.

One aspect of the invention is a tool for removing split shot weights from fishing line, including:

a) a finger sheath having a round cross section adapted to fit over a finger tip, said finger sheath having a first end and a second end such that the first end has a smaller cross sectional area than the second end;

b) a finger retainer, extending across the first end of the finger sheath, whereby when a finger tip is placed within the finger sheath it is retained therein by the finger retainer; and c) a curved blade having a curvature matching a radius of curvature of the finger sheath at a position near the second end of the fingersheath, the curved blade being attached to the finger sheath at the position and extending beyond the finger retainer.

In one preferred embodiment of the tool, the finger sheath and finger retainer of the tool are integral parts, such as a common metal sewing thimble, preferably of the type which includes a body that is a section of a cone between two planes that are each parallel to the base of the cone and having a larger end and a smaller end and a cap across the smaller end. Optionally, the body of the thimble may also include a cylindrical part extending from the larger end of the conical section. A cylindrical blade is attached near the bottom of the conical section of the thimble body, or optionally the cylindrical section that extends from the conical section, and has a cylindrical curvature approximately equal to the curvature of at the position at which it is attached. The blade preferably surrounds about 60° of the circumference at the point of attachment.

In a second preferred embodiment of the tool, the finger sheath includes two rings, a larger ring and a smaller ring, supported by a structure. The finger retainer comprises at least one member extending across the large end. A cylindrical blade is attached to the larger ring and has a cylindrical curvature that approximately matches the curvature of the bottom ring at the position of attachment. The blade preferably surrounds about 60° of the circumference at the point of attachment.

Preferably, the tool further includes a "U" shaped clip that is attached to the finger sheath at a position generally opposite from the blade which can conveniently be used to compress a split shot onto a fishing line.

Preferably, the tool still further comprises an attachment means for attaching the tool to an elastic retractor of the type customarily used by fisherpersons for attaching their equipment to a vest or lanyard device. The attachment means can be an aperture in the finger sheath or an external loop attached to the tool.

BRIEF DESCRIPTION OF THE DRAWINGS

These and other features, aspects and advantages of the present invention will become better understood with regard to the following description, appended claims and accompanying drawings, where:

DESCRIPTION OF THE PREFERRED EMBODIMENTS

The invention solves the fisherperson's problem of removing split shot weights from a fishing line while in the act of fishing. Removing a split shot from a fishing line is not per se a difficult task. A split shot weight is applied by placing a fishing line in the split and compressing the shot so that the split closes around the line. The split shot is removed by prying the shot open. The inventor has observed from years of fishing that a convenient way to remove a shot from a line is to hold the shot between the thumb and index finger of one hand and to use a fingernail from another hand to open the shot, by inserting the fingernail in the split opening and pushing the fingernail to open the shot. A problem with this approach is that fingernails can break or be damaged in the course of the removal. The invention is designed to closely simulate a fingernail with a curved blade attached to a finger covering such as a common sewing thimble. The curved blade is particularly suited for prying open a split shot by inserting one side of the blade into a corner of the split and pushing and then dragging the curved blade through the split and twisting to open up the crimped or closed shot.

It should be noted that in this application reference is frequently made to the word "finger". It should be understood that as used in this application, in the both the specification and the appended claims, finger means one of the digits attached to a person's hand and specifically includes the thumb. Similarly, as used in this application the word "fingernail" encompasses "thumbnail".

One preferred embodiment of the invention is a tool that comprises an ordinary metal sewing thimble of the type which includes a body that approximates a section of a cone between two planes that are each parallel to the base of the cone and having a larger end and a smaller end and a cap closing the smaller end. The tool further comprises a curved blade that is attached to the thimble at a position near the larger end, preferably in the ⅓ of the thimble nearest to the larger end, more preferably in the ⅕ nearest to the larger end. The curved blade preferably has a cylindrical curvature with a radius of curvature approximately equal to that of the thimble at the position of attachment. The tool preferably also includes a "U" shaped clip, which is attached to the tool approximately opposite from the curved blade. The "U" shaped clip is used for compressing the sides of a piece of split shot to apply the piece of shot to a fishing line. The tool preferably also has a place to attach the device to an elastic retractor which fisherpersons use to attach equipment to a fishing vest or clip on to a lanyard device. This may be by means of a hole in the body of the thimble, or a loop attached to the thimble.

Preferably the blade is metal, more preferably steel or stainless steel. The thimble is also preferably metal and may be aluminum, steel, or stainless steel. The blade is attached to thimble by welding, soldering, brazing or other methods appropriate to the materials of construction, that are well known to those skilled in assembly of metal components.

The blade preferably subtends an angle of between about 30° and about 120° of the body at the point of attachment of the blade is attached to the body, and more preferably about 45° to about 90°. The blade has a thickness so that a side of the blade will fit into a corner of a compressed shot. A thickness of between about 1/16 inch and 1/64 inch is appropriate.

The "U" shaped clip is preferably made of spring metal such as spring steel which will withstand repeated flexing to compress pieces of split shot.

Figure 1:
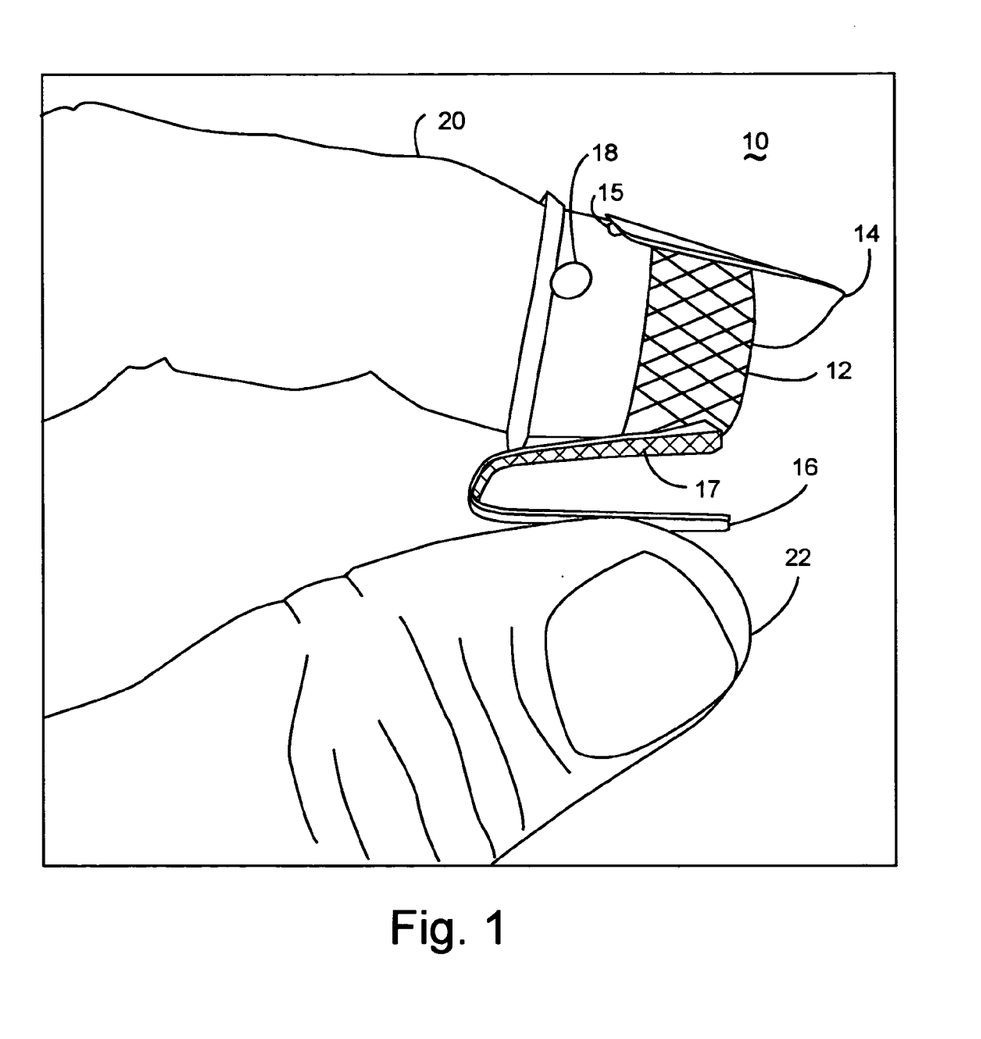
FIG. 1 is a perspective view of one preferred embodiment of the invention deployed on a person's finger as it would be used.

Moving to the figures, FIG. 1 shows a preferred shot-opening tool 10, deployed on finger 20. The tool includes a thimble 12, a curved blade 14, and a "U" shaped clip 16. The clip 16 has a surface roughening 17 on the inside to facilitate holding the split shot. The tool has a hole 18 in the body of the thimble for attaching a retractor. The curved blade is welded to the thimble near the bottom of the thimble with a line of weld terminating at point 15. The radius of curvature of the blade is equal to the radius of the thimble at position 15. The "U" shaped clip is used by inserting a piece of shot within the "U" and compressing with adjacent finger 22.

Figure 2:
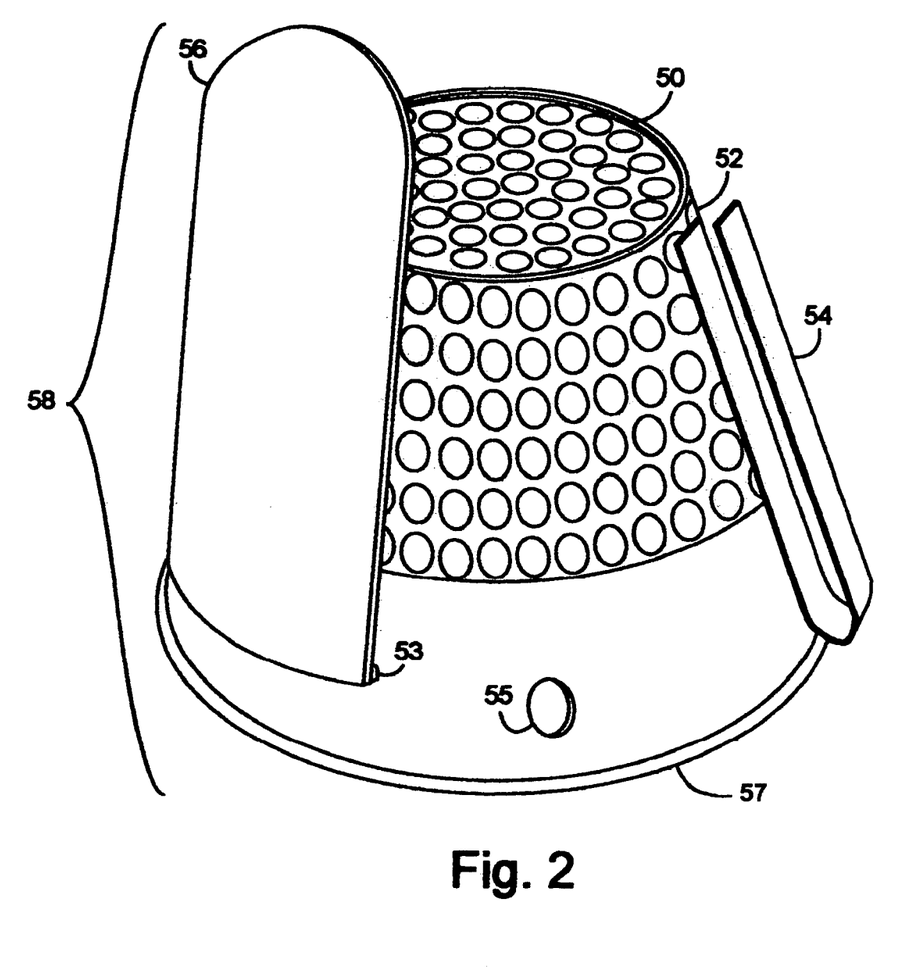
FIG. 2 is a perspective drawing of one preferred embodiment of the invention.

FIG. 2, shows a tool 58 with a thimble having a cap 50 and body 52, and a curved blade 56 and "U" shaped clip 54 attached to the body 52 of the thimble. The tool has a hole 55 for attachment of a retractor. The thimble body 52 is a section of a cone between the cap 50 and the large end 57. The curved blade 56 is attached to the body 52 by solder joint 53.

Figure 3:
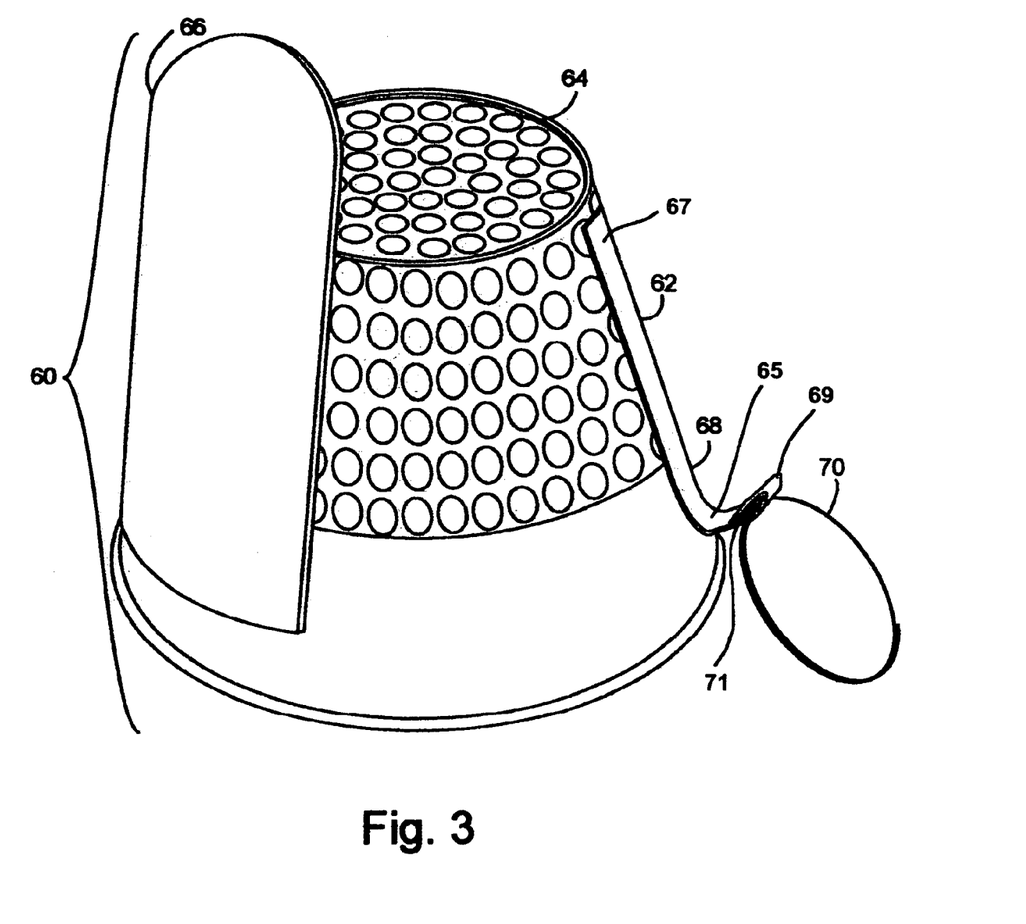
FIG. 3 is a perspective drawing of a second preferred embodiment of the invention.

FIG. 3 shows another embodiment 60, a tool without a "U" shaped clip. The tool 60 includes a cap 64, a body 62, a curved blade 66, and a loop 70 attached to the body by attachment strip 68 attached to the body 62.

The attachment strip 68 is attached in abutment to the body 62 at one end portion 67 and has an opposite end portion 69 which extends outwardly away from the body 62 and wherein there is a bend 65 in the attachment strip 68 between the one end portion 67 and the opposite end portion 69. The one end portion 67 is a planar surface which is attached to an outer surface of the body 62. The opposite end portion 69 extends from the bend 65 in a cantilevered manner. The loop 70 is pivotally attached to the opposite end portion 69 through an aperture 71 in the opposite end portion 69. The loop 70 can be used for attaching to a retractor.

Figure 4:
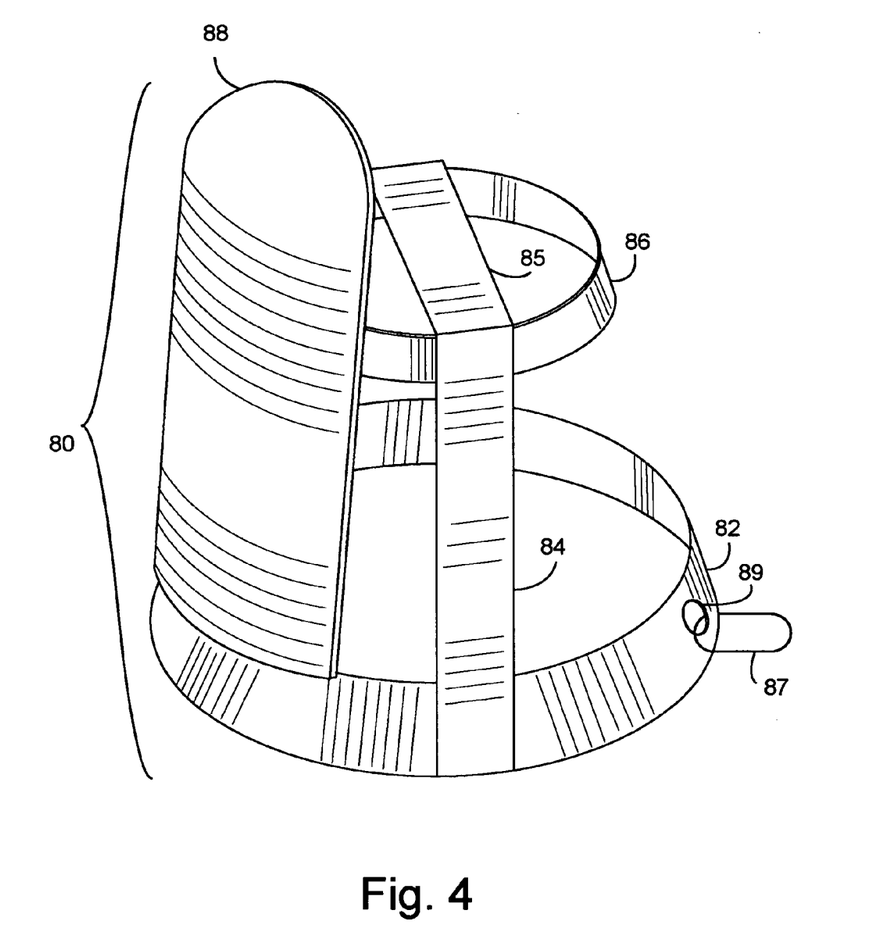
FIG. 4 is a perspective drawing of a third preferred embodiment of the invention.

FIG. 4 shows another embodiment of the invention, a shot opening tool 80 including a finger sheath that includes two rings 82 and 86 and support 84, and finger retainer 85 that extends across and is attached to ring 86, and curved blade 88 which is attached to ring 82 near the bottom of the finger sheath. The tool also includes a loop 87 attached through a hole in ring 89.

Figure 5:
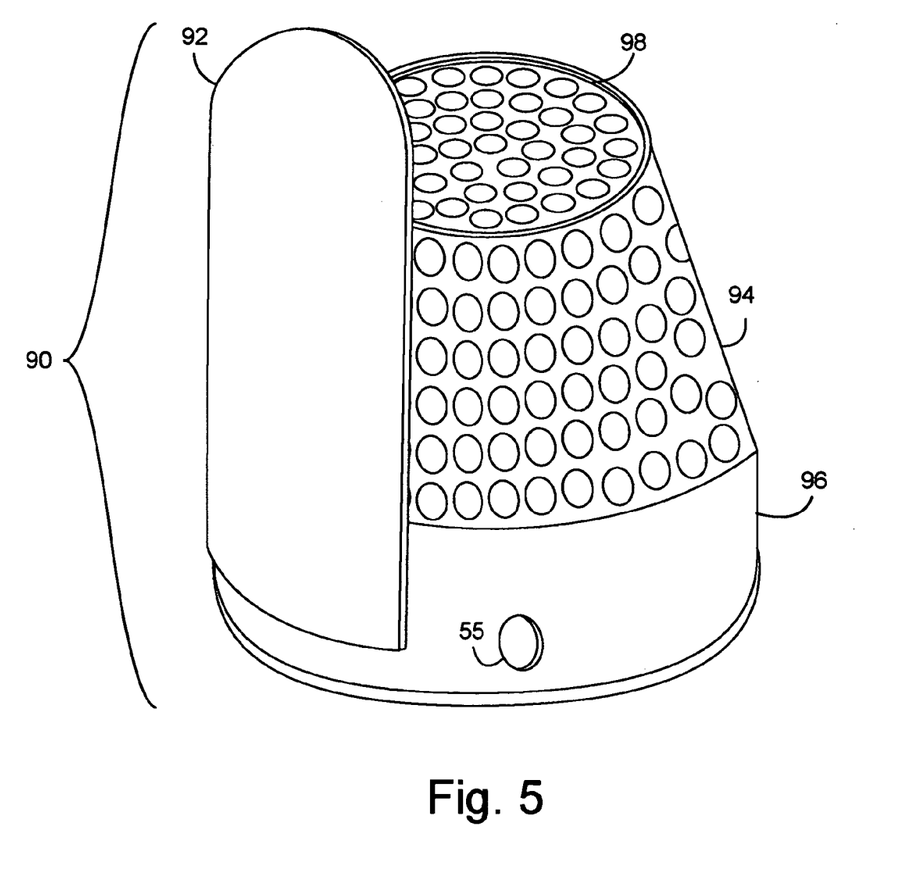
FIG. 5 is a perspective drawing of a fourth preferred embodiment of the invention.

FIG. 5 shows an alternative embodiment of the invention, a tool 90. In this embodiment the thimble has a cap 98, a body which includes a first portion that approximates a section of a cone 94, and a second portion which approximates a cylinder 96 wherein the second portion extends from the first portion. A curved blade 92 is attached to the second portion and has a radius of curvature approximately equal to the radius of the cylinder.

Figure 6:
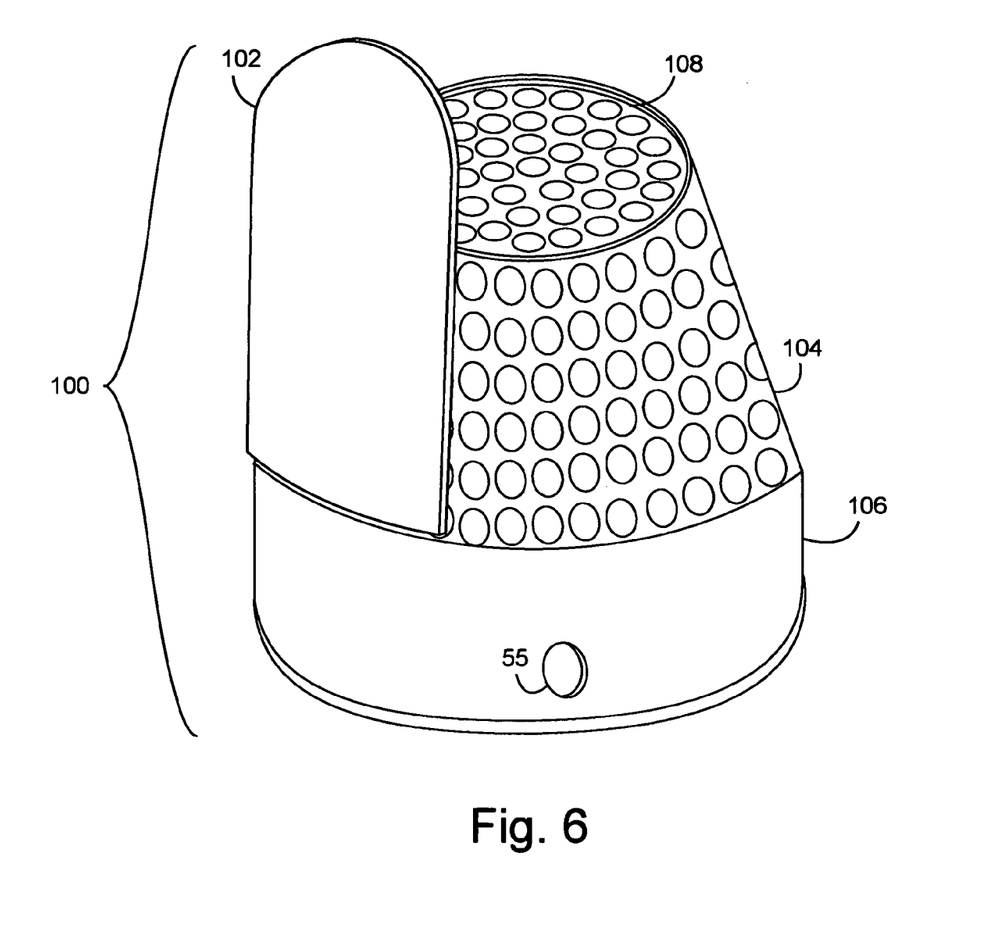
FIG. 6 is a perspective drawing of a fifth preferred embodiment of the invention.

FIG. 6 shows still another alternative embodiment, a tool 100 involving a thimble of the type having a body which includes a first portion that approximates a section of a cone 104, and a second portion which approximates a cylinder 106 wherein the second portion extends from the first portion. In this embodiment, a curved blade 102 is attached to the conical portion 104 at a position near the intersection of first portion and the second portion, and has a radius of curvature approximately equal to the radius of curvature of the conical portion at the point of attachment.

Where components in the embodiments have been described as having a cylindrical or conical section shape it is to be understood that the dimensions and uniformity need only be approximate.

In all embodiments, the tool is made by conventional metal working methods, well known to those skilled in the art.

The tool is used for removing a split shot which has been compressed onto a fishing line by inserting the curved blade into the split section and rotating it to spread the shot apart so that the shot can be removed. A preferred method is to insert one side of the curved blade into a corner of the split and dragging the blade through the split and twisting to pry open the shot.

Although the present invention has been described in considerable detail with reference to certain preferred versions thereof, other versions are possible. Therefore the spirit and scope of the appended claims should not be limited to the preferred versions herein.

What is claimed is:

1. A tool suitable for use with split shot comprising:
   a) a thimble comprising an approximately circular open end and an approximately circular closed end and a body between the open end and the closed end defining a cavity adapted to receive a finger within the cavity, wherein the open end has a larger radius than the closed end;
   b) a blade attached to the thimble at a position near the open end, the blade extending slightly beyond the closed end; and
   c) means near the open end suitable for attaching the tool to a fisherperson's vest or to a lanyard device, wherein the means for attaching comprises an attachment strip and a loop, the attachment strip having one end portion attached in abutment to the body and an opposite end portion, and wherein there is a bend in the attachment strip between the one end portion and the opposite end portion, the opposite end portion extending from the bend in a cantilevered manner, the loop extending through an aperture in the opposite end portion.

2. A tool suitable for use with split shot comprising:
   a) a thimble comprising an approximately circular open end and an approximately circular closed end and a body between the open end and the closed end defining a cavity adapted to receive a finger within the cavity, wherein the open end has a larger radius than the closed end;
   b) a curved blade attached to the thimble at a position near the open end, the curved blade having a curvature approximately matching a radius of curvature of the thimble at the position, the curved blade extending beyond the closed end; and
   c) means for attaching the tool to clothing comprising an attachment strip and a loop, the attachment strip having one end portion attached in abutment to the body and an opposite end portion, and wherein there is a bend in the attachment strip between the one end portion and the opposite end portion, the opposite end portion extending from the bend in a cantilevered manner, and the loon extending through an aperture in the opposite end portion.

3. The tool of claim 2, wherein the thimble comprises a metal chosen from the group consisting of aluminum, steel, stainless steel, brass and copper.

4. The tool of claim 2 wherein the tool is capable of being attached to a fisherperson's vest.

5. A tool suitable for use with split shot comprising:
   a) a thimble comprising an approximately circular open end and an approximately circular closed end and a body between the open end and the closed end defining a cavity adapted to receive a finger within the cavity, wherein the open end has a larger radius than the closed end;
   b) a curved blade attached to the thimble at a position near the open end, the curved blade having a concave side, the concave side in contact with the thimble at the position, the curved blade extending beyond the closed end; and
   c) means for attaching the tool to clothing or to a lanyard device, the means for attaching comprising an attachment strip and a loop, the attachment strip having one end portion attached in abutment to the body and an opposite end portion, and wherein there is a bend in the attachment strip between the one end portion and the opposite end portion, the opposite end portion extending from the bend in a cantilevered manner, the loop extending through an aperture in the opposite end portion.

6. A method of opening a split shot having a closed slot that is crimped around a fishing line comprising the steps of:
   a) placing a tool onto a finger tip, the tool comprising a thimble having an approximately circular open end and an approximately circular closed end and a body between the open end and closed end defining a cavity adapted to receive a finger within the cavity, and wherein the open end has a larger radius than the closed end, and a curved blade attached to the thimble at a position near the open end, the curved blade having a curvature approximately matching a radius of curvature of the thimble at the position, the curved blade extending beyond the closed end;
   b) placing the curved blade into the closed slot; and
   c) manipulating the curved blade to open the slot.

7. The method of claim 6, wherein manipulating the curved blade comprises pushing on the curved blade.

8. The method of claim 6, wherein manipulating the curved blade comprises twisting the curved blade.

9. The method of claim 6, wherein manipulating the curved blade comprises dragging the curved blade through the slot.

10. The method of claim 6, wherein said thimble comprises a sewing thimble.

11. The method of claim 6, wherein said thimble comprises metal.

12. The method of claim 11, wherein said thimble and said curved blade each comprise a metal selected from the group consisting of aluminum, steel, stainless steel, brass and copper.

13. The method of claim 6, said tool comprising a "U" shaped clip, the "U" shaped clip having an open end and a closed end; the "U" shaped clip being attached to the thimble roughly opposed from the curved blade such that the open end of the "U" shaped clip is near the closed end of the thimble.

14. The method of claim 13, wherein the "U" shaped clip comprises spring metal.

15. The method of claim 14, wherein the spring metal comprises spring steel.

16. The method of claim 6, wherein the blade subtends an angle of about 60° of the approxiniately circular open end of the body at the position.

17. The method of claim 6, said tool comprising means for crimping a split shot, the means attached to the thimble.

18. The method of claim 17, wherein said means comprises a "U" shaped clip, the "U" shaped clip having an open end and a closed end, the "U" shaped clip being attached to the thimble roughly opposed from the curved blade such that the open end of the "U" shaped clip is near the closed end of the thimble.

19. The method of claim 6, wherein the curved blade has a curvature matching the radius of curvature of the thimble at the position.

20. The method of claim 6, wherein said tool comprises means for attaching the tool to clothing.

21. The method of claim 6, wherein said tool comprises means for attaching the tool to a lanyard device.

22. A method of opening a split shot having a closed slot that is crimped around a fishing line comprising the steps of:

a) placing a tool onto a finger tip, the tool comprising a thimble having an approximately circular open end and an approximately circular closed end and a body between the open end and closed end defining a cavity adapted to receive a finger within the cavity, and wherein the open end has a larger radius than the closed end, and a curved blade attached to the thimble at a position near the open end, the curved blade having a concave side, the concave side in contact with the thimble at the position, the curved blade extending beyond the closed end;

b) placing the curved blade into the closed slot; and c) manipulating the curved blade to open the slot.

* * * * *